United States Patent [19]

Corsmeier

[11] Patent Number: 4,951,973

[45] Date of Patent: Aug. 28, 1990

[54] JOINT CONNECTION FOR ANNULAR FLANGES

[75] Inventor: Robert J. Corsmeier, Cincinnati, Ohio

[73] Assignee: General Electric Company, Cincinnati, Ohio

[21] Appl. No.: 169,552

[22] Filed: Mar. 17, 1988

[51] Int. Cl.⁵ .............................................. F16L 35/00
[52] U.S. Cl. ...................................... 285/24; 285/367; 285/421
[58] Field of Search ............... 285/364, 367, 325, 421, 285/406, 24; 29/428

[56] References Cited

U.S. PATENT DOCUMENTS

| | | | |
|---|---|---|---|
| 349,511 | 9/1886 | McKenzie | 285/364 X |
| 1,592,093 | 7/1926 | Foucault | 285/325 |
| 1,949,055 | 2/1934 | Lambie | 285/91 |
| 1,965,915 | 7/1934 | Wilson | 285/364 X |
| 2,417,025 | 3/1947 | Volpin | 285/177 |
| 2,466,602 | 4/1949 | Lombard et al. | 285/175 |
| 2,716,563 | 8/1955 | Seneschall | 285/129 |
| 2,809,057 | 10/1957 | McEachern | 285/187 |
| 3,940,008 | 2/1976 | Flanders | 220/5 |

FOREIGN PATENT DOCUMENTS

| | | | |
|---|---|---|---|
| 105198 | 1/1927 | Australia | 285/364 |
| 1158328 | 11/1963 | Fed. Rep. of Germany | 285/364 |

Primary Examiner—Dave W. Arola
Attorney, Agent, or Firm—Jerome C. Squillaro

[57] ABSTRACT

A joint connection for abutting first and second flanges, particularly the annular flanges of a jet engine and exhaust nozzle, comprises a transverse lip formed on the second flange which overlies the first flange when they are axially engaged. A C-shaped clamp extends over the upper half of the abutting flanges having spaced clamp arms which straddle the flanges so that one clamp arm faces the first flange and the other clamp arm faces the second flange. A locking spring is positioned between the first flange and the adjacent clamp arm, and the facing surfaces of the locking spring and first flange are formed with mating wedge lock elements extending outwardly therefrom. The locking spring is movable to a locked position relative to the clamp arm and first flange wherein the mating wedge lock element of the locking spring and first flange engage one another and force the locking spring against the adjacent clamp arm. This wedges the first and second flanges tightly between the clamp arms of the clamp to connect them together.

56 Claims, 6 Drawing Sheets

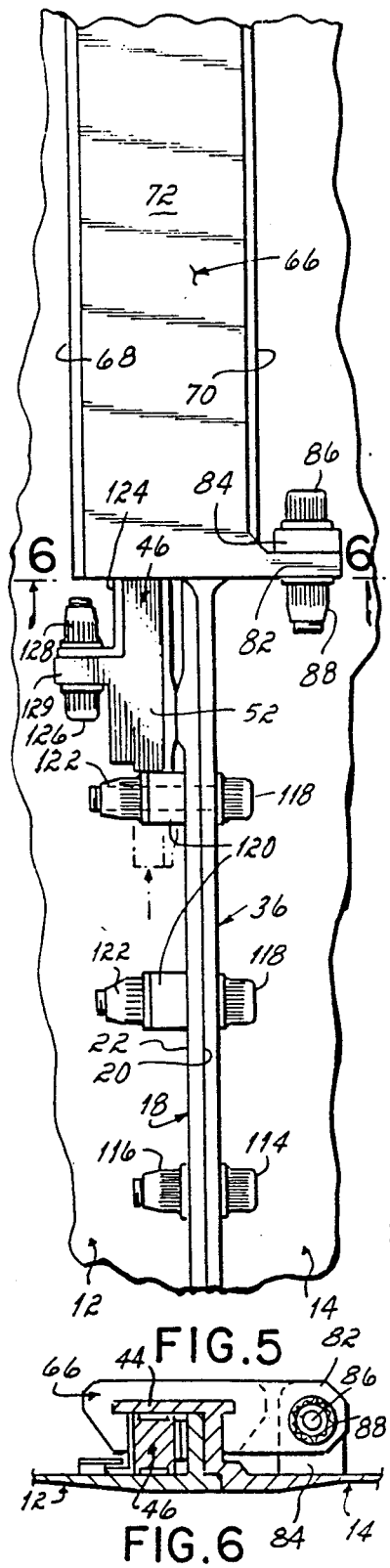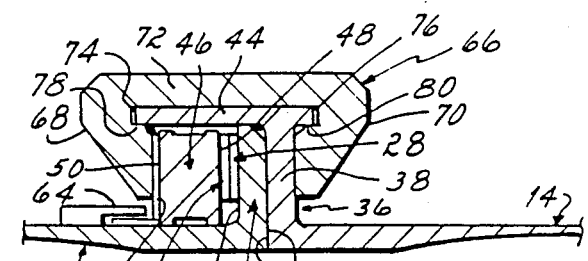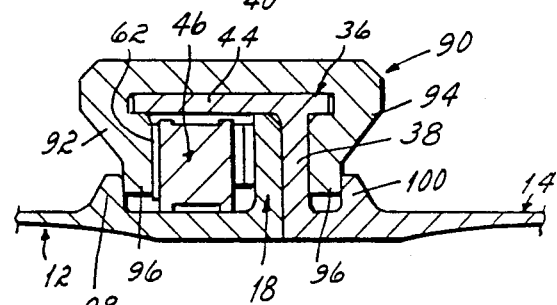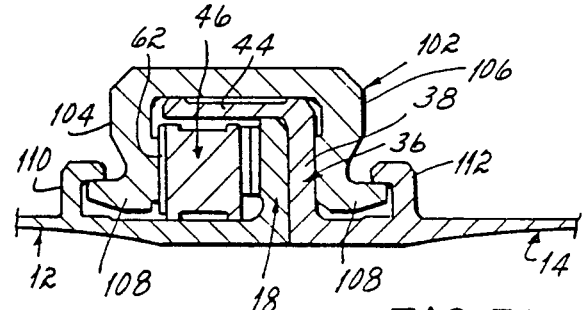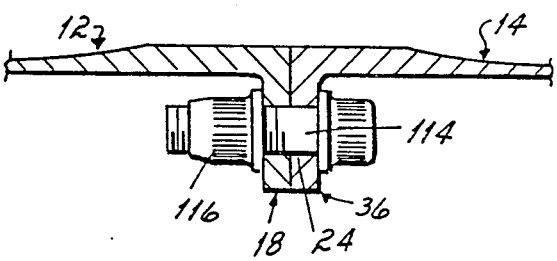

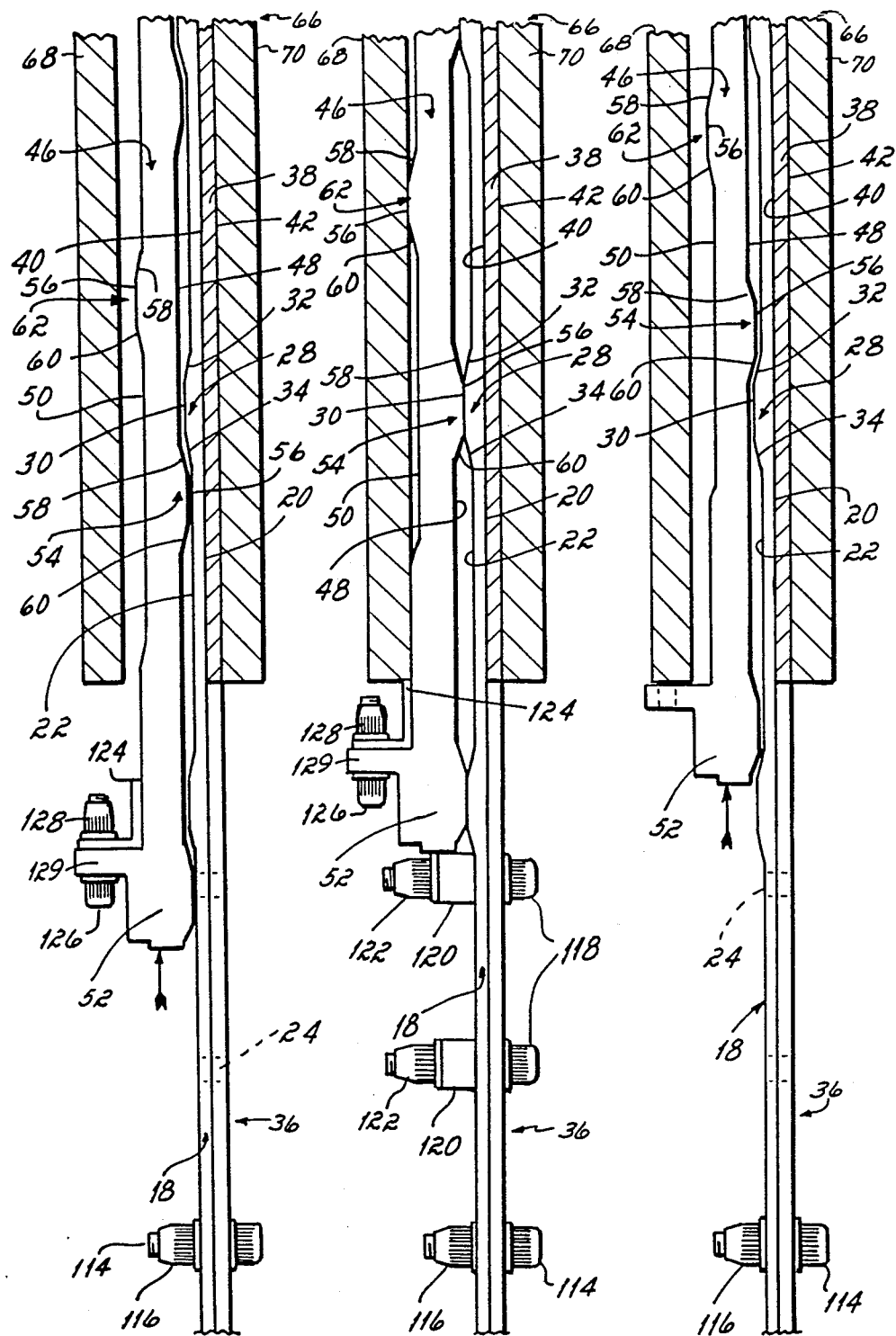

JOINT CONNECTION FOR ANNULAR FLANGES

The Government has rights in this invention pursuant to Contract No. F33657-83-C-0281 awarded by the Department of the Air Force.

FIELD OF THE INVENTION

This invention relates to joint connections, and, more particularly, to joint structure for connecting two abutting, annular flanges such as the flange of a jet engine and the flange of an aircraft exhaust nozzle.

BACKGROUND OF THE INVENTION

Maintenance procedures for some types of aircraft require that the exhaust nozzle remain in the aircraft while the engine is being exchanged. The primary reason for this requirement is to save maintenance time when it becomes necessary to replace or perform maintenance on the engines.

The engine is formed with an annular flange which abuts an annular flange formed on the exhaust nozzle. In the prior art, a plurality of spaced bores are formed around the circumference of each flange. The engine is mounted to the exhaust nozzle by aligning the bores of the two flanges and then inserting bolts therebetween which are secured by nuts. The bolts circumferentially align the engine with the exhaust nozzle and provide a lightweight, reliable connection. Additionally, the bolts carry tension and shear loads applied to the joint to prevent axial separation of the engine flange from the exhaust nozzle flange.

Although a bolted flange connection between the engine and exhaust nozzle is advantageous in some respects, it substantially increases the maintenance time required to exchange an engine or exhaust nozzle. One problem with bolted connections involves initially positioning the engine flange in proper alignment with the exhaust nozzle flange. Such flanges have planar abutting surfaces and it is difficult and time consuming to align the flanges vertically and circumferentially when the engine is being lifted into place against the exhaust nozzle.

Additionally, while the bolts and nuts in the bottom half of the engine flange and exhaust nozzle flange are easily accessible by removing the cowling around the lower half of the engine, the bolts and nuts in the top half of the flanges are extremely difficult or impossible to reach with the engine and exhaust nozzle mounted in the aircraft. This is because there is usually a limited amount of space at that location, and the available space is filled with other hardware and/or structure.

Attempts have been made in the prior art to solve this problem such as by providing access doors in the aircraft so that the bolts and nuts at the top of the engine and exhaust nozzle flanges can be reached. The problem with this solution is that access doors increase the weight of the aircraft, add expense to its construction and do not fully alleviate the access problem.

SUMMARY OF THE INVENTION

It is therefore among the objectives of this invention to provide a joint connection between the engine flange and exhaust nozzle flange in an aircraft which is quickly and easily installed and disconnected, which prevents axial separation between the flanges and which facilitates the alignment and positioning of one flange with respect to the other.

These objectives are accomplished in a joint connection for mounting the annular flange of a first element such as a jet engine, to the annular flange of a second element such as the exhaust nozzle in an aircraft. The exhaust nozzle flange is formed with a transverse lip along a portion thereof which engages the annular flange on the jet engine to facilitate alignment of the engine vertically and side-to-side relative to the exhaust nozzle during the assembly procedure. The lower half or 180° arc length of each annular flange is formed with a plurality of spaced bores which align with one another and receive bolts secured by nuts. The upper halves of the two flanges are interconnected by a wedge lock system which comprises a C-shaped clamp and a pair of locking springs. The C-shaped clamp is formed with opposed clamp arms which straddle the abutting flanges of the engine and exhaust nozzle so that a space is provided between one of the clamp arms and the engine flange. The locking springs are inserted in this space from a readily accessible area, i.e., at approximately the horizontal center line of the engine, and are movable to a "locked" position in which wedge lock elements formed on one side of the locking spring engage, in one embodiment, mating wedge lock elements formed on the engine flange and wedge lock elements on the opposite side of the locking spring engage the facing clamp arm of the clamp. This has the effect of tightly wedging the locking spring between the engine flange and one clamp arm, which, in turn, forces the engine flange tightly against the exhaust nozzle flange and securely clamps such flanges between the opposed clamp arms of the C-shaped clamp. If desired, a seal may be interposed between the abutting surfaces of such flanges to avoid leakage therebetween.

In the presently preferred embodiment, a single C-shaped clamp extending through a 180° arc length is provided for mounting the top half of the engine flange to the top half of the exhaust nozzle flange. The C-shaped clamp comprises a pair of spaced clamp arms connected by a leg. In one embodiment, the clamp arms are each formed with a notch or slot at the leg forming a pair of shoulders. These shoulders slide along outwardly extending ends of the transverse lip formed on the exhaust nozzle flange to mount the C-shaped clamp thereon. In alternative embodiments, the clamp arms of the C-shaped clamp are formed to engage structure on the engine and/or exhaust nozzle which prevents the clamp arms from spreading apart from one another when the locking springs are moved to the locked position.

The locking springs are preferably formed with an inner and outer surface each having a plurality of spaced, wedge lock elements in the form of a rectangular or square shaped projection having a planar upper surface and angled edges. The wedge lock elements are staggered from one another on the inner and outer surfaces such that adjacent wedge lock elements on the inner surface of the locking spring are positioned on either side of wedge lock elements on the outer surface of the locking spring.

In one embodiment, the outer surface of the engine flange which faces the inner surface of the locking spring is formed with wedge lock elements which are identical to and mate with the wedge lock elements on the locking spring. As described in detail below, the locking spring is movable circumferentially relative to the engine flange between a locked position in which the wedge lock elements of the locking spring engage the wedge elements of the engine flange, and an unlocked position in which the wedge elements of the locking spring are positioned between the wedge elements on the engine flange.

In an alternative embodiment, the inner surface of the clamp arm which faces the locking spring is formed with mating wedge lock elements instead of the engine flange The wedge lock elements on the opposite side of the locking spring therefore engage a smooth or planar inner surface of the engine flange upon movement of the locking spring to the "locked" position.

The engine is mounted to the exhaust nozzle in the following manner. Initially, it is assumed that the exhaust nozzle is in position in the aircraft with its mounting flange facing forwardly. The engine is then wheeled into position beneath the engine cowling and lifted vertically upwardly into the aircraft. In one embodiment, the locking spring is releasably secured in an "unlocked" position along side the engine flange during this initial assembly procedure wherein the wedge lock elements of the locking spring are located in the spaces between adjacent wedge lock elements on the facing surface of the engine flange. An outer end of the locking spring extends beyond the lower end of the engine flange as the engine is vertically lifted into position.

The engine is moved vertically upwardly until the engine flange contacts the transverse lip formed on the exhaust nozzle flange. This transverse lip is helpful in aligning the two flanges vertically and side-to-side before they are moved axially into abutment with one another. With the engine flange in the proper vertical position relative to the exhaust nozzle flange, the engine is then moved axially so that the inner surface of the engine flange abuts the inner surface of the exhaust nozzle flange.

The next step in the assembly operation is to install the C-shaped clamp over the lower 180° portion of the mating flanges, and then slide it circumferentially around the entire upper half or 180° portion of the engine flange and exhaust nozzle flange. Beginning at the bottom of the upper half of the exhaust nozzle flange, i.e., approximately at the horizontal center line thereof, the C-shaped clamp is slid onto the transverse lip of the exhaust nozzle flange such that the leg of the clamp rests atop the transverse lip and the outwardly extending ends of the transverse lip slide along the shoulders formed in the C-shaped clamp at the clamp arms. In one embodiment, one of the clamp arms faces the outer surface of the exhaust nozzle flange, and the other clamp arm faces the locking spring which was previously positioned along side of the engine flange which is formed with wedge lock element. In an alternative embodiment wherein wedge lock elements are formed on a clamp arm of the clamp, the locking spring is supported on the clamp and then slid with the clamp onto the exhaust nozzle flange and engine flange as described above With the C-shaped clamp so positioned, the engine may then be rotated in a clockwise or counterclockwise direction, as required, so that the bores on the lower half of the engine flange align with the bores on the lower half of the exhaust nozzle flange. Bolts are then inserted through such aligning bores, except for two or three bores nearest the horizontal center line of the flanges, and are then secured by nuts.

An important feature of this invention is that substantial axial clearance is provided to enable the C-shaped clamp to be inserted over the engine flange and exhaust nozzle flange without either of the clamp arms encountering resistance. This enables the C-shaped clamp to be formed in a large 180° arc length and yet be easily installed, and also easily removed even after operation of the engine wherein both the engine flange and exhaust nozzle flange may become oxidized from the intense heat. This relatively large tolerance also accommodates warpage and machining tolerances in the fabrication of both of the flanges and also the C-shaped clamp.

A stop is provided at one end of the C-shaped clamp which engages a mating stop on the exhaust nozzle flange to properly position the clamp circumferentially relative to the flanges. Once the C-shaped clamp is in proper position, the outwardly extending end of the locking spring is struck by a hammer or the like to circumferentially move it into a "locked" position. In moving to the locked position, the wedge lock elements of the locking spring ride upwardly along the angled ends of the wedge lock elements on either the engine flange or the clamp arm of the clamp until the planar surface of each wedge lock element on the locking spring rests against the mating planar surface of the wedge lock elements on the engine flange or clamp arm. In turn, the wedge lock elements on the opposite side of the locking spring are forced against the adjacent surface which is not formed with wedge lock elements, i.e., the clamp arm of the C-shaped clamp in one embodiment or the engine flange in an alternative embodiment.

The wedge lock elements on the locking spring, and on the engine flange or clamp arm, are dimensioned so that when they engage one another a substantial axial force is exerted by the locking spring on both the engine flange and adjacent clamp arm. In turn, the engine flange is forced tightly against the exhaust nozzle flange which abuts the other clamp arm. This substantial force is obtained because the locking spring is deflected to a limited degree at each location where its wedge lock elements contact another surface.

For example, in the embodiment wherein mating wedge lock elements are formed on the engine flange, the locking spring is deflected upon movement to the locked position by contact of the wedge lock elements on its inner surface with the mating wedge lock element on the engine flange and by contact of the wedge lock elements on its outer surface with the facing clamp arm of the clamp. Contact with the mating wedge lock elements on the engine flange deflects the locking spring slightly in an outward direction toward the clamp arm, whereas contact of the wedge lock elements on the locking spring with the clamp arm deflects the locking spring in the opposite, inward direction toward the engine flange. Because the wedge lock elements on the inner and outer surfaces of the locking spring are staggered or offset relative to one another, such inward and outward deflection thereof produces a balanced sinusoidal pattern of deflection along the length of the locking spring. This deflection of the locking spring wedges it in place between the abutting clamp arm and engine flange to increase the axial force therebetween. As a result, the engine flange and exhaust nozzle flange are tightly wedged between the straddling clamp arms of the C-shaped clamp, and this maintains the upper half of the engine flange and exhaust nozzle flange in the assembled position.

In order to disassemble the engine from the exhaust nozzle, the locking spring is moved to an unlocked position by striking its outer end. This moves the locking spring circumferentially inwardly relative to the engine flange and clamp arm causing the wedge lock elements on the locking spring to disengage the wedge lock elements on the engine flange or clamp arm. The engine and locking spring can then be removed as a unit after the C-clamp is slid circumferentially off of the exhaust nozzle flange.

In an alternative embodiment, projections are formed on both the engine and exhaust nozzle which engage the lower ends of the clamp arms. These projections prevent the clamp arms from spreading apart in response to the axial force applied thereto by the locking spring. In a further alternative embodiment, the lower ends of the clamp arms are received within an L-shaped projection formed on each of the engine flange and exhaust nozzle flange which prevent the C-shaped clamps from moving upwardly with respect to the transverse lip of the exhaust nozzle flange, and from spreading apart in the transverse direction relative to the engine flange and exhaust nozzle flange.

DESCRIPTION OF THE DRAWINGS

The structure, operation and advantages of a presently preferred embodiment of this invention will become further apparent with reference to the following description taken in conjunction with the accompanying drawings, wherein:

FIG. 3 is a cross sectional view taken along line 3—3 of FIG. 2 showing one embodiment of the clamping arrangement herein;

FIG. 3A is an alternative embodiment of the clamping structure illustrated in FIG. 3;

FIG. 3B is a still further alternative embodiment of the clamping structure shown in FIG. 3;

FIG. 4 is a cross sectional view of the bolt connection for the lower halves of the engine flange and exhaust nozzle flange taken generally along line 4—4 of FIG. 2;

FIG. 5 is an elevational side view of the assembled engine flange and exhaust nozzle flange taken generally along line 5—5 of FIG. 2;

FIG. 6 is a bottom view of the assembled engine flange and exhaust nozzle flanges taken generally along line 6—6 of FIG. 5;

FIG. 7 is a partial cross sectional view of the engine flange, exhaust nozzle flange and clamp with the locking spring in an unlocked position for assembly of the flanges;

FIG. 8 is a view similar to FIG. 7 with the locking spring moved to the locked position and the remaining bolts attached between the engine flange and exhaust nozzle flange;

FIG. 9 is a view similar to FIGS. 7 and 8 in which the locking spring has been moved from the locked position shown in FIG. 8 to an unlocked position for disassembly of the flanges;

DETAILED DESCRIPTION OF THE INVENTION

Figure 1:
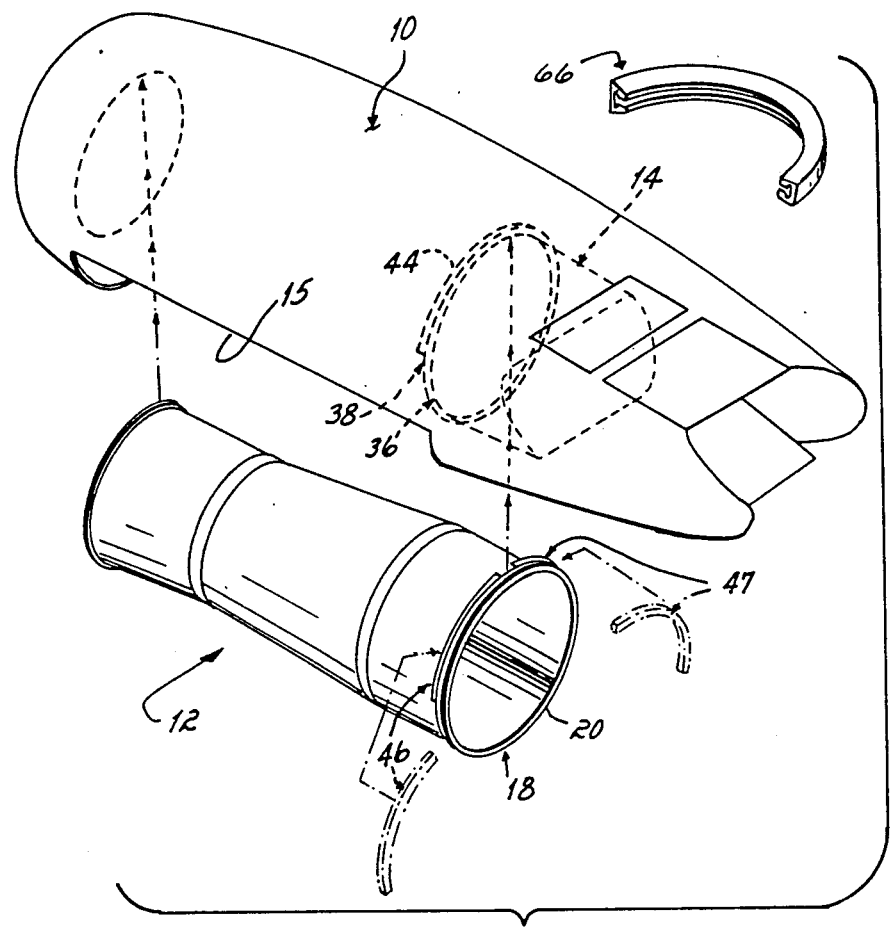
FIG. 1 is a schematic perspective view of a portion of the air frame cowling of an aircraft with the exhaust nozzle mounted therein and the engine in an initial position for mounting to the exhaust nozzle.

Referring now to FIG. 1, an air frame cowling 10 is illustrated which houses the engine 12 and exhaust nozzle 14. Access doors (not shown) in the bottom of the air frame cowling 10 permit installation and removal of the engine 12 through bottom opening 15. The upper half of the engine 12 and exhaust nozzle 14 when positioned within the air frame cowling 10 are difficult to access through opening 15 and this invention is directed to a mounting structure for interconnecting the upper portion of the engine 12 and exhaust nozzle 14 which overcomes the access problem and permits the engine 12 to be quickly connected and disconnected from the exhaust nozzle 14. Such connection and disconnection facilitates removal, repair and/or replacement of the engine 12 without removal of the nozzle 14.

Referring now to FIGS. 1-3 and 7-9, the aft end of the engine 12 is provided with an upright, annular engine flange 18 having an inner surface 20 and an outer surface 22. The lower half or 180° arc length of the annular engine flange 18 is formed with a plurality of spaced, circumferential bores 24 (FIG. 2) which extend approximately to the horizontal center line 26 thereof as viewed in FIG. 2.

Figure 1A:
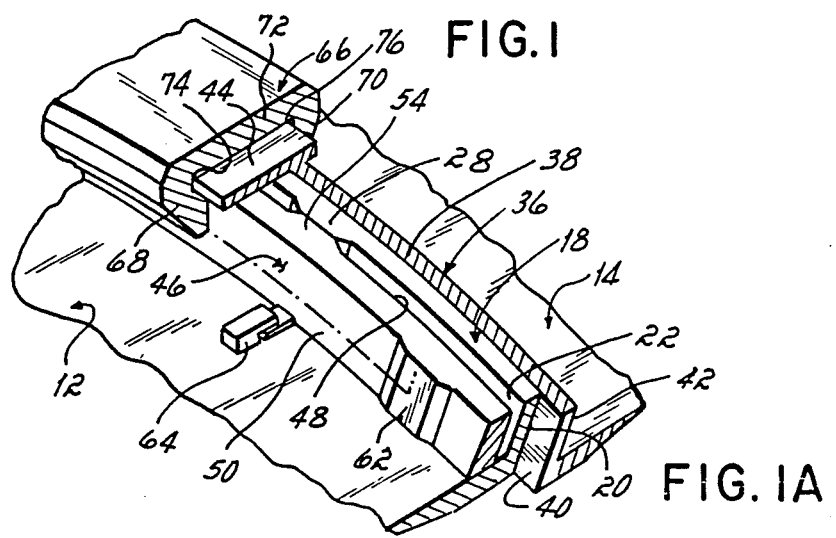
FIG. 1A is a fragmentary schematic perspective view, partially broken away for illustrative purposes, of the engine flange, the exhaust nozzle flange, the locking ring and the clamp in an assembled relationship.

As best seen in FIGS. 1A and 7, and as discussed in more detail below, the upper half or 180° arc length of the engine flange 18 is formed with a plurality of spaced, wedge lock elements 28. The wedge lock elements 28 are either formed integral with or mounted upon the outer surface 22 of the engine flange 18. Each wedge lock element 28 projects axially outwardly from the outer surface 22 of engine flange 18 and is formed in a rectangular or square shape with a planar outer surface 30 and angular or tapered angled ends 32, 34.

Figure 2:
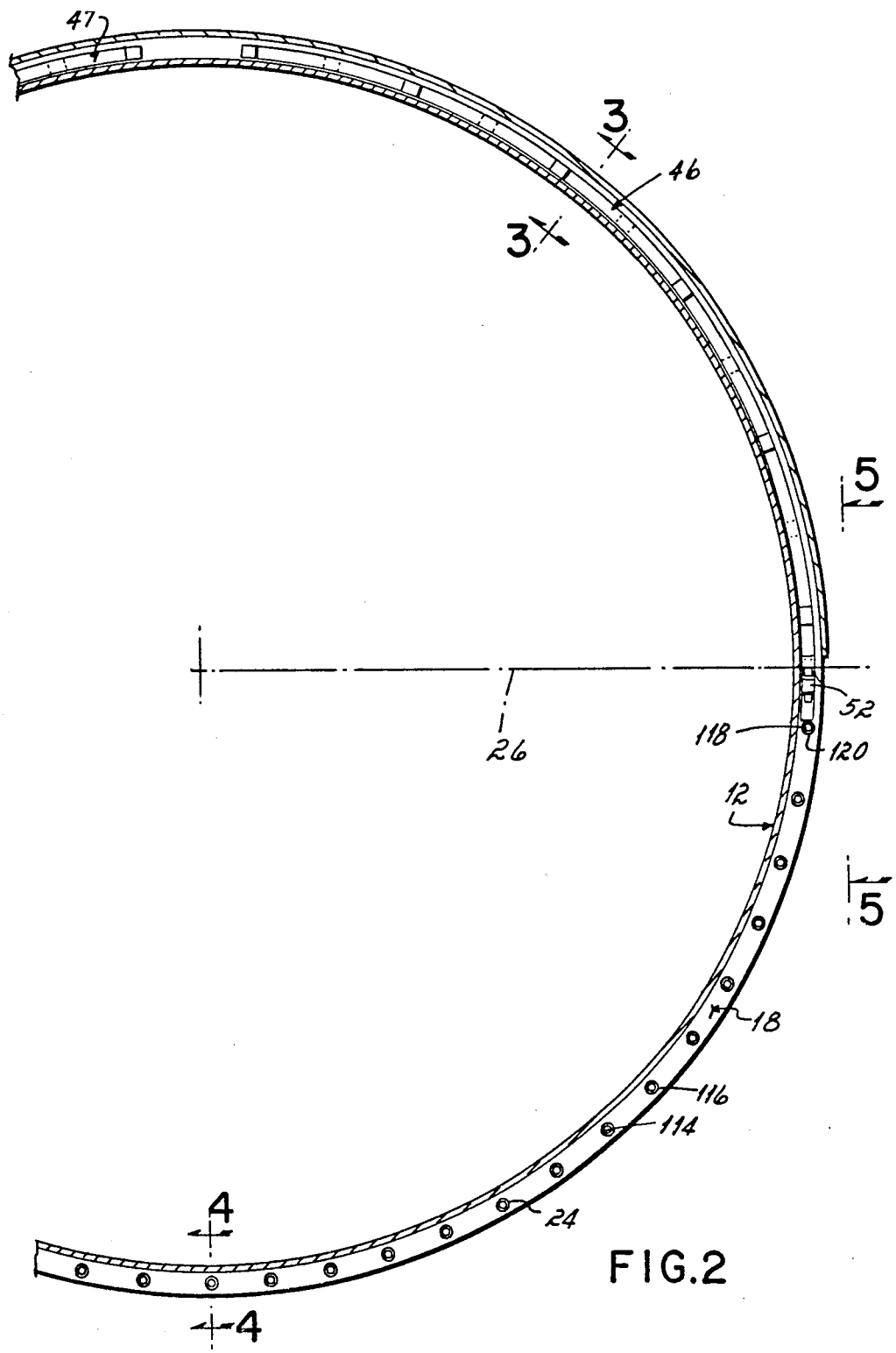
FIG. 2 is a cross sectional view showing a portion of the upper and lower halves of the engine flange and exhaust nozzle flange in an assembled position.
Figure 11:
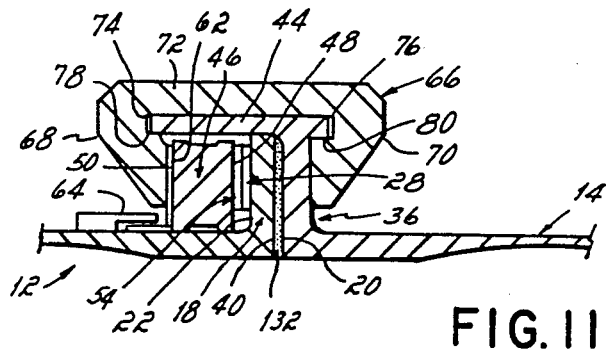
FIG. 11 is a view similar to FIG. 3 in which a seal is interposed between the engine flange and exhaust nozzle flange.

The forward end of the exhaust nozzle 14 is formed with an annular exhaust nozzle flange 36 along its entire circumference. The upper half or 180° arc length which extends above the horizontal center line 26, as viewed in FIG. 2, is T-shaped in cross section (FIG. 1A and 3) having a radial or vertical leg 38 formed with an inner surface 40 and an outer surface 42, which is connected at its radial outer end to a transverse lip 44 extending perpendicularly to the vertical leg 38. As discussed in more detail below in connection with a description of the assembly operation, the exhaust nozzle flange 36 is adapted to engage the engine flange 18 such that the inner surface 40 of exhaust nozzle flange 36 abuts the inner surface 20 of engine flange 18 and the transverse lip 44 of exhaust nozzle flange 36 overlies the engine flange 18 above the horizontal center line 26. If desired, a seal 132 can be interposed between the abutting surfaces of the exhaust nozzle flange 36 and engine flange 18 to avoid leakage therebetween as shown in the alternative embodiment of FIG. 11.

Referring now to FIG. 1, a pair of locking springs 46, 47 are provided for securing the engine flange 18 to the exhaust nozzle flange 36, as discussed in detail below. Only the locking spring 46 is illustrated in detail in the drawings, it being understood that another identical, except opposite hand, locking spring 47 is located on the opposite side of the engine 12 for securing the engine flange 18 to the exhaust nozzle flange 36.

As best shown in FIGS. 1A, 2 and 7, the locking spring 46 is an arcuate, metal section or strip formed in a 90° arc length having an inside surface 48, an outside surface 50 and an outer end 52. The inside surface 48 of locking spring 46 is formed with a plurality of wedge lock elements 54 which are adapted to mate with the wedge lock elements 28 formed on the outer surface 22 of engine flange 18. Each wedge lock element 54 on the inside surface 48 of locking spring 46 projects axially outwardly therefrom and is formed with a planar outer surface 56 having angled or arcuate ends 58, 60. The outside surface 50 of locking spring 46 is formed with a plurality of spaced wedge lock elements 62 which are identical in configuration to the wedge elements 54 and are labeled with the same reference numbers The wedge lock elements 62 on the outside surface 50 of locking spring 46 are positioned in between adjacent wedge elements 54 on the inside surface 48 of locking spring 46.

The 90° locking spring 46 cooperates with a 180° C-shaped clamp 66 to secure the upper half of engine flange 18 to the upper half of exhaust nozzle flange 36. In one presently preferred embodiment illustrated in FIGS. 1A and 3, the C-shaped clamp 66 comprises a pair of spaced clamp arms 68, 70 which are connected by a band 72. Slots 74, 76 are formed in each clamp arm 68, 70, respectively, forming shoulders 78, 80 thereat which are spaced from the transverse band 72. Alternative embodiments of clamp 66, illustrated in FIGS. 3A and 3B, will be discussed in detail below.

Figure 10A:
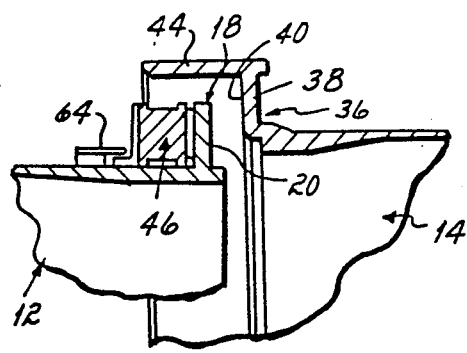
FIGS. 10A–10F illustrate the steps in assembling the engine flange and exhaust nozzle flange employing the locking structure of this invention.
Figure 10B:
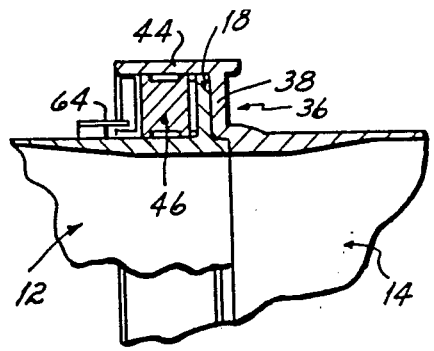
Figure 10C:
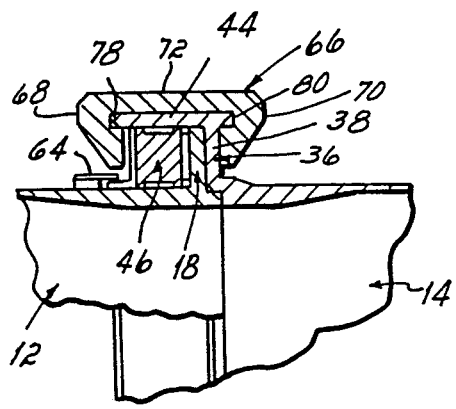

Referring now to FIGS. 10A-10F, and to FIGS. 7-9, the sequence for mounting the flange 18 of engine 12 to the flange 36 of exhaust nozzle 14 is illustrated employing the joint connection structure of this invention. Initially, as viewed in FIGS. 1 and 10A, the engine 12 is moved vertically and axially toward the exhaust nozzle 14 with the locking springs 46, 47 mounted by keepers 64 to the engine flange 18. The transverse lip 44 of exhaust nozzle flange 36 aids in vertical and side-to-side alignment between engine flange 18 with exhaust nozzle flange 36 as the engine 12 is slid into place against the exhaust nozzle 14. As shown in FIG. 10B, the engine flange 18 is in proper position relative to exhaust nozzle flange 36 where their inner surfaces 20, 40, respectively, abut one another and the transverse lip 44 of the exhaust nozzle flange 36 overlies the engine flange 18.

The 180° C-shaped clamp 66 is then mounted to the exhaust nozzle flange 36 so that its clamp arms 68, 70 straddle flanges 18, 36 and the locking spring 46 carried on the engine flange 18. See FIG. 10C. Beginning at the lower 180° of the exhaust nozzle flange 36, approximately in alignment with the horizontal center line 26 as viewed in FIG. 2, the C-shaped clamp 66 is slid onto the exhaust nozzle flange 36 such that its band 72 overlies the transverse lip 44 of exhaust nozzle flange 36 and the shoulders 78, 80 formed in the clamp arms 68, 70, respectively, ride along the transverse lip 44. In this position, as shown in FIG. 7, the clamp arm 70 faces the outer surface 42 of exhaust nozzle flange 36 and the clamp arm 68 faces the outside surface 50 of locking spring 46.

As illustrated in FIGS. 5 and 6, a stop 82 is formed at one end of the C-shaped clamp 66, and that stop 82 engages an extension 84 formed on the housing of the exhaust nozzle 14. The purpose of the stop 82 and extension 84 is to ensure that the C-shaped clamp 66 is automatically properly positioned circumferentially relative to the exhaust nozzle flange 36 and the engine flange 18 upon assembly. A bolt 86 extends through the stop 82 and extension 84 and is secured thereto by a nut 88 so that the C-shaped clamp 66 is maintained in a fixed, circumferential position.

Figure 10D:
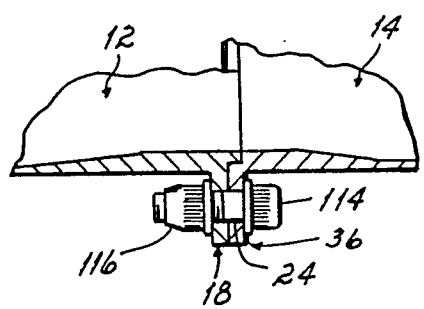
Figure 10E:
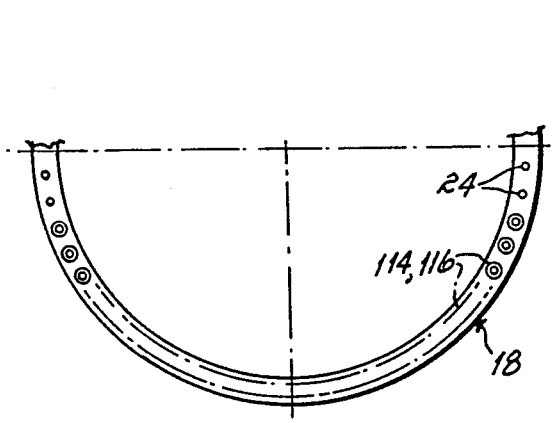

The next step in the installation operation is to insert bolts 114 through the aligning bores 24 in the bottom half of engine flange 18 and exhaust nozzle flange 36 below the horizontal center line 26 as viewed in FIGS. 2, 10D and 10E. With the exception of approximately two bores near the horizontal center line 26, all of the bolts 114 are inserted and tightened in place by nuts 116.

Figure 10F:
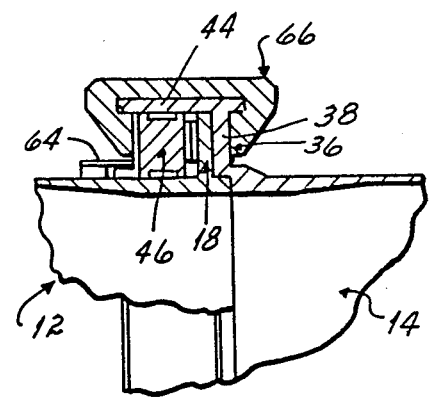

Locking of the C-shaped clamp 66 to securely connect the engine flange 18 and exhaust nozzle flange 36 is illustrated in FIGS. 7, 8 and 10F. As mentioned above, the locking springs 46, 47 are carried upon the engine flange 18 by keepers 64 in an "unlocked" position wherein the wedge elements 54 of locking spring 46 extend in between adjacent wedge elements 28 on the engine flange 18. In this position, the outer end 52 of the locking spring 46 extends outwardly beyond the clamp 66 and below the horizontal center line 26 as viewed in FIG. 2. With the locking springs 46, 47 in an unlocked position, the C-shaped clamp 66 can be easily slid along the exhaust nozzle flange 36 without its clamp arms 68, 70 becoming wedged against either the exhaust nozzle flange 36 or locking spring 46. A relatively loose fit is provided to facilitate such motion of C-shaped clamp 66 which is particularly advantageous upon removing C-shaped clamp 66 from the engine flange 18 and exhaust nozzle flange 36 after the engine 12 has been operated because such surfaces become oxidized.

As shown in FIG. 7, a hammer or other tool is then used to strike the outer end 52 of locking spring 46 to force the locking spring 46 to move circumferentially upwardly relative to the horizontal center line 26 to a "locked" position with respect to the clamp 66 and engine flange 18. See FIG. 8. In moving to the locked position, the wedge elements 54 on the inside surface 48 of locking spring 46 slide along the angled ends 34 of the wedge elements 28 on engine flange 18 until the planar outer surface 56 of wedge elements 54 on the locking spring 46 engage and mate with the planar outer surface 30 of the wedge elements 28 on engine flange 18. At the same time, the wedge elements 62 on the outside surface 50 of locking spring 46 engage the facing surface of clamp arm 68. Preferably, at least some deflection of the locking spring 46 is obtained in the area between adjacent wedge elements 54 and wedge elements 62. The locking spring 46 thus applies an axial force against both the facing clamp arm 68 and the engine flange 18. As a result of the axial force applied by the locking spring 46, the engine flange 18 and exhaust nozzle flange 36 are tightly held together between the two clamp arms 68, 70 of the C-shaped clamp 66.

In order to ensure that the clamp arms 68, 70 of C-shaped clamp 66 do not spread apart upon movement of the locking spring 46 to the locked position, it may be desirable to employ alternative embodiments of the C-shaped clamp 66, as illustrated in FIGS. 3A or 3B. In FIG. 3A, a C-shaped clamp 90 is provided having clamp arms 92, 94 each formed with a vertical end portion 96. These end portions 96 each engage a stop or extension 98, 100 formed on the engine 12 and exhaust nozzle 14, respectively, which prevent the clamp arms 92, 94 from spreading apart when the locking spring 46 is moved into the lock position or when engine loads tend to separate flanges 18 and 36.

A second alternative embodiment is illustrated in FIG. 3B in which a C-shaped clamp 102 is formed with a pair of clamp arms 104, 106 each having a transverse end section 108. The engine 12 is formed with an L-shaped projection 110 which engages the end section 108 of clamp arm 104, and, similarly, the exhaust nozzle 14 is formed with an L-shaped projection 112 which engages the end section 108 of clamp arm 106. In this embodiment, non shoulders are formed at the upper portion of clamp arms 104, 106 to engage the transverse lip 44 of exhaust nozzle flange 36. Instead, the L-shaped projections 110, 112 retain the clamp arms 104, 106 against both radially outward movement relative to the engine 12 and exhaust nozzle 14, and also transverse movement of the clamp arms 104, 106 away from each other.

The final bolts 118, which are longer than bolts 114 and provide additional tension and shear load capability, are then inserted within the remaining open holes nearest the horizontal center line 26 in the bottom half of engine flange 18 and exhaust nozzle flange 36. The bolts 118 are provided with washers 120 and are secured by nuts 122. As shown in FIGS. 5 and 8, one washer 120 acts as a stop for the locking spring 46 to prevent it from moving downwardly relative to the horizontal center line 26 and from releasing between the engine flange 18 and clamp arm 68. Additionally, the locking spring 46 is provided with a stop 124 which is secured by a bolt 126 and nut 128 to an extender 129 mounted to the outer end 52 of locking spring 46. The stop 124 engages the edge of C-shaped clamp 66 to limit the circumferential movement of locking spring 46 and ensure that its wedge lock elements 54 seat on the mating wedge lock elements 28 of engine flange 18.

In order to disconnect the engine 12 from the exhaust nozzle 14, the locking spring 46 is advanced to the unlocked position, which permits removal of the C-shaped clamp 66. First remove bolts 118 and 114 from flanges 18 and 36, remove stop 124 and then strike the outer end 52 of locking spring 46 to advance it further in a counterclockwise direction until the wedge lock elements 54 fall in between adjacent wedge lock elements 28 of the engine flange 18. See FIG. 9. The clamp 66 can then be removed to release engine 12 from exhaust nozzle 14.

Figure 12:
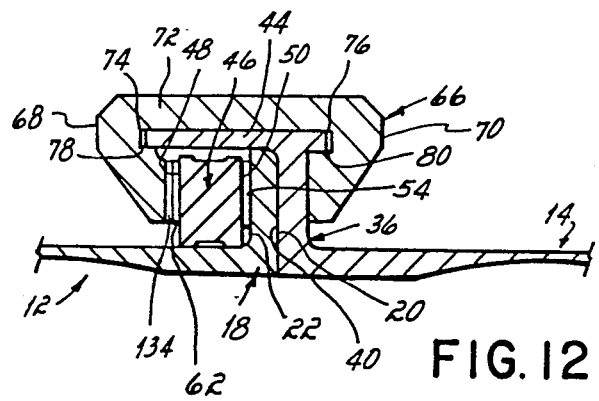
FIG. 12 is a view similar to FIG. 3 of an alternative embodiment in which wedge lock elements mating with those of the locking spring are formed on the clamp arm of the clamp instead of on the engine flange.

Referring now to FIG. 12, an alternative embodiment of the locking arrangement herein is illustrated. The structure of FIG. 12 is nearly identical to that of FIG. 3, except for the location of the wedge lock elements which mate with locking spring 46, and thus the same reference numbers used in FIG. 3 appear in FIG. 12 for the same structure. In this embodiment, the wedge lock elements are eliminated from the outer surface 22 of engine flange 18. Instead, the inner surface of the clamp arm 68 which faces locking spring 46 is formed with spaced wedge lock elements 134 which are adapted to mate with the wedge lock elements 62 on the outer surface 50 of locking spring 46. In turn, the wedge lock elements 54 on the opposite, inner side 48 of locking spring 46 engage the outer surface 22 of engine flange 18 with the locking spring 46 in the "locked" position.

The procedures for assembly and disassembly of the engine flange 18 and exhaust nozzle flange 36 described above are essentially identical when employing the embodiment of FIG. 12, except that the locking spring 46 is supported on the clamp 66 prior to mounting the clamp 66 over the engine flange 18 and exhaust nozzle flange 36. That is, the clamp 66 and locking spring 46 are slid as a unit onto the abutting flanges 18, 36, and then the locking spring 46 is moved to the locked and unlocked positions in the identical fashion as described above and shown in FIGS. 7-9.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the locking structure of this invention has been illustrated in the context of securing an annular engine flange to an annular flange of an exhaust nozzle in a jet aircraft. It is contemplated, however, that the locking spring 46 and clamp 66 could be readily adapted for securing the flanges of other structural members which need not necessarily be annular in shape. Moreover, the specific flange configurations illustrated in FIGS. 3–3B could be modified without departing from the scope of this invention. Additionally, the locking spring 46 and C-shaped clamp 66 need not extend through a 90° and 180° arc length, respectively, but could be constructed at different angles so that one, two or more clamps and/or locking springs could be employed to secure the flanges in place.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for connecting a first element to a second element, comprising:
   a first flange formed on said first element, said first flange having an inner surface and an outer surface;
   a second flange formed on said second element, said second flange having an inner surface and an outer surface, said inner surface of said second flange abutting said inner surface of said first flange;
   a clamp having first and second clamp arms which straddle said outer surface of a first flange and said outer surface of said second flange;
   a locking spring positioned between said first clamp arm and said outer surface of said first flange; said locking spring having a planar surface;
   first wedge lock elements extending outwardly from a surface of said locking spring planar surface, and mating second wedge lock elements extending outwardly from one of said first clamp arm and said outer surface of said first flange;
   said locking spring being movable to a locked position between said first clamp arm and said first flange in which said first wedge lock elements engage said mating second wedge lock elements to force said locking spring against said first clamp arm and said outer surface of said first flange, said locking spring and said first and second flanges being tightly wedged between said first and second clamp arms for connecting the first and second elements together.

2. The apparatus of claim 1 in which said first and second clamp arms each have an inner surface facing one of said first and second flanges, said locking spring being formed with an inner surface and an outer surface, said first wedge lock elements being formed on said outer surface of said locking spring which faces said inner surface of said first clamp arm, said mating second wedge lock elements being formed on said facing inner surface of said first clamp arm.

3. The apparatus of claim 4 in which said inner surface of said locking spring faces said outer surface of said first flange and is formed with third wedge lock elements which contact said first flange upon movement of said locking spring to said locking position.

4. The apparatus of claim 1 in which said second flange is formed with a lip, said lip overlying at least a portion of said first flange.

5. The apparatus of claim 1 in which said clamp is a C-shaped member formed with a band connecting said first and second clamp arms.

6. Apparatus for connecting a first element to a second element, comprising:
- a first flange formed on said first element, said first flange having an inner surface and an outer surface;
- a second flange formed on said second element, said second flange having an inner surface and an outer surface, said inner surface of said second flange abutting said inner surface of said first flange;
- a clamp having first and second clamp arms which straddle said outer surface of a first flange and said outer surface of said second flange;
- a locking spring positioned between said first clamp arm and said outer surface of said first flange;
- first wedge lock elements extending outwardly from said locking spring, and mating second wedge lock elements extending outwardly from one of said first clamp arm and said outer surface of said first flange;
- said locking spring being movable to a locked position between said first clamp arm and said first flange in which said first wedge lock elements engage said mating second wedge lock elements to force said locking spring against said first clamp arm and said outer surface of said first flange, said locking spring and said first and second flanges being tightly wedged between said first and second clamp arms for connecting the first and second elements together; and
- wherein said locking spring is formed with an inner surface and an outer surface, said first wedge lock elements being formed on said inner surface thereof which faces said outer surface of said first flange, said mating second wedge lock elements being formed on said facing outer surface of said first flange.

7. The apparatus of claim 6 in which said outer surface of said locking spring faces said first clamp arm and is formed with third wedge lock elements which contact said first clamp arm upon movement of said locking spring to said locked position.

8. Apparatus for connecting a first element to a second element, comprising:
- a first flange formed on said first element, said first flange having an inner surface and an outer surface;
- a second flange formed on said second element, said second flange having an inner surface and an outer surface, said inner surface of said second flange abutting said inner surface of said first flange;
- a clamp having first and second clamp arms which straddle said outer surface of a first flange and said outer surface of said second flange wherein said clamp is a C-shaped member formed with a band connecting said first and second clamp arms;
- a locking spring positioned between said first clamp arm and said outer surface of said first flange;
- first wedge lock elements extending outwardly from said locking spring, and mating second wedge lock elements extending outwardly from one of said first clamp arm and said outer surface of said first flange;
- said locking spring being movable to a locked position between said first clamp arm and said first flange in which said first wedge lock elements engage said mating second wedge lock elements to force said locking spring against said first clamp arm and said outer surface of said first flange, said locking spring and said first and second flanges being tightly wedged between said first and second clamp arms for connecting the first and second elements together; and
- wherein each of said first and second elements is formed with a stop, each of said clamp arms of said clamp being formed to engage said stop in one of said first and second elements to prevent said clamp arms from spreading apart relative to one another upon movement of said locking element to said locked position.

9. The apparatus of claim 8 in which said stop is a projection connected to each of said first and second elements, each of said projections having a planar surface engageable with one of said first and second clamp arms.

10. The apparatus of claim 8 in which said stop is an L-shaped projection having a vertical leg connected to a horizontal leg, said clamp being positioned relative to said L-shaped projections so that each of said clamp arms face said vertical leg, and said horizontal leg overlies at least a portion of each said clamp arms.

11. Apparatus for connecting a first element to a second element, comprising: 'a first flange formed on said first element, said first flange having an inner surface and an outer surface; a second flange formed on said second element, said second flange having an inner surface and an outer surface, said inner surface of said second flange abutting said inner surface of said first flange;
- a clamp having first and second clamp arms which straddle said outer surface of a first flange and said outer surface of said second flange;
- a locking spring positioned between said first clamp arm and said outer surface of said first flange;
- first wedge lock elements extending outwardly from said locking spring, and mating second wedge lock elements extending outwardly from one of said first clamp arm and said outer surface of said first flange;
- said locking spring being movable to a locked position between said first clamp arm and said first flange in which said first wedge lock elements engage said mating second wedge lock elements to force said locking spring against said first clamp arm and said outer surface of said first flange, said locking spring and said first and second flanges being tightly wedged between said first and second clamp arms for connecting the first and second elements together; and
- wherein said locking spring is provided with a stop engageable with said clamp with said locking spring in said locked position to ensure said wedge lock elements of said locking spring are positioned to mate with said wedge lock elements formed on one of said clamp and said first flange.

12. The apparatus of claim 11 in which said clamp is formed with a slot extending along each of said first and second clamp arms, said slot receiving said lip of said exhaust nozzle flange for securing said clamp thereto.

13. Apparatus for connecting a first element to a second element, comprising:
   a first flange formed on said first element, said first flange having an inner surface and an outer surface;
   a second flange formed on said second element, said second flange having an inner surface and an outer surface, said inner surface of said second flange abutting said inner surface of said first flange;
   a clamp having first and second clamp arms which straddle said outer surface of a first flange and said outer surface of said second flange;
   a locking spring positioned between said first clamp arm and said outer surface of said first flange;
   first wedge lock elements extending outwardly from said locking spring, and mating second wedge lock elements extending outwardly from one of said first clamp arm and said outer surface of said first flange;
   said locking spring being movable to a locked position between said first clamp arm and said first flange in which said first wedge lock elements engage said mating second wedge lock elements to force said locking spring against said first clamp arm and said outer surface of said first flange, said locking spring and said first and second flanges being tightly wedged between said first and second clamp arms for connecting the first and second elements together; and
   wherein said clamp is formed with a stop adapted to engage an extension formed on one of said first and second elements, said extension being connected to said stop with a fastening means for securing said stop to said extension, thus preventing circumferential movement of said clamp relative to said first and second flanges.

14. Apparatus for connecting a first element to a second element, comprising:
   a first flange formed on said first element, said first flange having an inner surface and an outer surface;
   a second flange formed on said second element, said second flange having an inner surface and an outer surface, said inner surface of said second flange abutting said inner surface of said first flange;
   a clamp having first and second clamp arms which straddle said outer surface of a first flange and said outer surface of said second flange;
   a locking spring positioned between said first clamp arm and said outer surface of said first flange;
   first wedge lock elements extending outwardly from said locking spring, and mating second wedge lock elements extending outwardly from one of said first clamp arm and said outer surface of said first flange;
   said locking spring being movable to a locked position between said first clamp arm and said first flange in which said first wedge lock elements engage said mating second wedge lock elements to force said locking spring against said first clamp arm and said outer surface of said first flange, said locking spring and said first and second flanges being tightly wedged between said first and second clamp arms for connecting the first and second elements together; and
   wherein said first wedge lock elements comprise a generally rectangular shaped section having a planar outer surface and opposed, angled ramp ends.

15. Apparatus for connecting a first element to a second element, comprising:
   a first flange formed on said first element, said first flange having an inner surface and an outer surface;
   a second flange formed on said second element, said second flange having an inner surface and an outer surface, said inner surface of said second flange abutting said inner surface of said first flange;
   a clamp having first and second clamp arms which straddle said outer surface of a first flange and said outer surface of said second flange;
   a locking spring positioned between said first clamp arm and said outer surface of said first flange;
   first wedge lock elements extending outwardly from said locking spring, and mating second wedge lock elements extending outwardly from one of said first clamp arm and said outer surface of said first flange;
   said locking spring being movable to a locked position between said first clamp arm and said first flange in which said first wedge lock elements engage said mating second wedge lock elements to force said locking spring against said first clamp arm and said outer surface of said first flange, said locking spring and said first and second flanges being tightly wedged between said first and second clamp arms for connecting the first and second elements together; and
   wherein said second wedge lock elements comprise a generally rectangular shaped section having a planar outer surface and opposed, angled ramp ends.

16. Apparatus for mounting an engine to the exhaust nozzle of a jet aircraft, comprising:
   an engine flange having an inner surface and an outer surface;
   an exhaust nozzle flange having an inner surface, an outer surface and a lip extending perpendicularly relative to at least a portion of said inner surface thereof, said inner surface of said exhaust nozzle flange abutting said inner surface of said engine flange so that said lip of said exhaust nozzle flange overlies said engine flange;
   a clamp mounted to said lip of said exhaust nozzle flange, said clamp having a first clamp arm with an inner surface facing said outer surface of said engine flange and a second clamp arm with an inner surface facing said outer surface of said exhaust nozzle flange;
   a locking spring positioned between said first clamp arm and said outer surface of said engine flange said locking spring having a planar surface;
   first wedge lock elements extending outwardly from a surface of said locking spring planar surface, and mating second wedge lock elements extending outwardly from one of said outer surface of said engine flange and said inner surface of said first clamp arm;
   said locking spring being movable relative to said engine flange and said first clamp arm to a locked position in which said first wedge lock elements of said locking spring engage said mating second wedge lock elements to force said locking spring against said first clamp arm and said engine flange, said locking spring, engine flange and exhaust nozzle flange being tightly wedged between said first and second clamp arms of said clamp to connect the engine to the exhaust nozzle.

17. The apparatus of claim 15 in which said first wedge lock elements comprise projections spaced along said locking spring, each of said projections being formed with an outer, planar surface and opposed, angled ramp ends.

18. The apparatus of claim 15 in which said locking spring is formed with an inner surface and an outer surface, said first wedge lock elements being formed on said outer surface thereof which faces said inner surface of said first clamp arm and said mating second wedge lock elements being formed on said facing inner surface of said first clamp arm, said outer surface of said locking spring being formed with third wedge lock elements which engage said outer surface of said engine flange upon movement of said locking spring to said locked position.

19. The apparatus of claim 18 in which said third wedge lock elements are formed on said outer surface of said locking spring between adjacent first wedge lock elements on said inner surface of said locking spring, said third wedge lock elements comprising projections spaced therealong, each of said projections being formed with an outer planar surface and opposed, angled ramp ends.

20. The apparatus of claim 15 in which a seal is interposed between said abutting inner surfaces of said engine flange and said exhaust nozzle flange.

21. Apparatus for mounting an engine to the exhaust nozzle of a jet aircraft, comprising:
an engine flange having an inner surface and an outer surface;
an exhaust nozzle flange having an inner surface, an outer surface and a lip extending perpendicularly relative to at least a portion of said inner surface thereof, said inner surface of said exhaust nozzle flange abutting said inner surface of said engine flange so that said lip of said exhaust nozzle flange overlies said engine flange;
a clamp mounted to said lip of said exhaust nozzle flange, said clamp having a first clamp arm with an inner surface facing said outer surface of said engine flange and a second clamp arm with an inner surface facing said outer surface of said exhaust nozzle flange;
a locking spring positioned between said first clamp arm and said outer surface of said engine flange;
first wedge lock elements extending outwardly from said locking spring, and mating second wedge lock elements extending outwardly from one of said outer surface of said engine flange and said inner surface of said first clamp arm;
said locking spring being movable relative to said engine flange and said first clamp arm to a locked position in which said first wedge lock elements of said locking spring engage said mating second wedge lock elements to force said locking spring against said first clamp arm and said engine flange, said locking spring, engine flange and exhaust nozzle flange being tightly wedged between said first and second clamp arms of said clamp to connect the engine to the exhaust nozzle; and
wherein said engine flange is an annular ring having a first section and a second section, said first section being formed with a plurality of spaced bores, said second section being formed with said inner surface which abuts said exhaust nozzle flange and said outer surface which is formed with said second wedge lock elements.

22. The apparatus of claim 21 in which said first section and said second section each extend along a 180° arc length.

23. The apparatus of claim 22 in which said exhaust nozzle flange is an annular ring having a third section and a fourth section, said third section being formed with a plurality of spaced bores which align with said spaced bores in said first section of said engine flange, said fourth section being formed with said lip which overlies said second section of said engine flange.

24. The apparatus of claim 23 in which said third section and said fourth section of said exhaust nozzle flange each extend along a 180° arc length.

25. The apparatus of claim 24 in which said clamp is an arcuate section formed in a 180° arc length, said clamp being positioned along said second section of said engine flange and said fourth section of said exhaust nozzle flange.

26. The apparatus of claim 24 in which said bores in said first section of said engine flange closest to said second section thereof and said bores in said third section of said exhaust nozzle flange closest to said fourth section thereof align with one another and receive a bolt, said bolt supporting a washer which forms a stop for retaining said locking spring in position between said second clamp arm and said outer surface of said engine flange.

27. The apparatus of claim 24 in which said locking spring is an arcuate section formed in a 90° arc length, a pair of said locking springs being positioned along said second section of said engine flange and said second clamp arm of said clamp.

28. The apparatus of claim 27 further including keepers for releasably mounting each of said locking springs to said engine flange.

29. Apparatus for mounting an engine to the exhaust nozzle of a jet aircraft, comprising:
an engine flange having an inner surface and an outer surface;
an exhaust nozzle flange having an inner surface, an outer surface and a lip extending perpendicularly relative to at least a portion of said inner surface thereof, said inner surface of said exhaust nozzle flange abutting said inner surface of said engine flange so that said lip of said exhaust nozzle flange overlies said engine flange;
a clamp mounted to said lip of said exhaust nozzle flange, said clamp having a first clamp arm with an inner surface facing said outer surface of said engine flange and a second clamp arm with an inner surface facing said outer surface of said exhaust nozzle flange;
a locking spring positioned between said first clamp arm and said outer surface of said engine flange;
first wedge lock elements extending outwardly from said locking spring, and mating second wedge lock elements extending outwardly from one of said outer surface of said engine flange and said inner surface of said first clamp arm;
said locking spring being movable relative to said engine flange and said first clamp arm to a locked position in which said first wedge lock elements of said locking spring engage said mating second wedge lock elements to force said locking spring against said first clamp arm and said engine flange, said locking spring, engine flange and exhaust nozzle flange being tightly wedged between said first and second clamp arms of said clamp to connect the engine to the exhaust nozzle; and wherein said locking spring is formed with an inner surface and an outer surface, said first wedge lock elements being formed on said inner surface thereof which faces said outer surface of said engine flange, and said mating second wedge lock elements being formed on said facing outer surface of said engine flange, said outer surface of said locking spring being formed with third wedge lock elements which engage said inner surface of said second clamp arm upon movement of said locking spring to said locked position.

30. Apparatus for mounting an engine to the exhaust nozzle of a jet aircraft, comprising:

an engine flange having an inner surface and an outer surface;

an exhaust nozzle flange having an inner surface, an outer surface and a lip extending perpendicularly relative to at least a portion of said inner surface thereof, said inner surface of said exhaust nozzle flange abutting said inner surface of said engine flange so that said lip of said exhaust nozzle flange overlies said engine flange;

a clamp mounted to said lip of said exhaust nozzle flange, said clamp having a first clamp arm with an inner surface facing said outer surface of said engine flange and a second clamp arm with an inner surface facing said outer surface of said exhaust nozzle flange;

a locking spring positioned between said first clamp arm and said outer surface of said engine flange;

first wedge lock elements extending outwardly from said locking spring, and mating second wedge lock elements extending outwardly from one of said outer surface of said engine flange and said inner surface of said first clamp arm;

said locking spring being movable relative to said engine flange and said first clamp arm to a locked position in which said first wedge lock elements of said locking spring engage said mating second wedge lock elements to force said locking spring against said first clamp arm and said engine flange, said locking spring, engine flange and exhaust nozzle flange being tightly wedged between said first and second clamp arms of said clamp to connect the engine to the exhaust nozzle; and wherein the engine is formed with a projection spaced from said engine flange and the exhaust nozzle is formed with a projection spaced from said exhaust nozzle flange, said clamp being positioned so that said first clamp arm extends between said exhaust nozzle flange and said projection on said exhaust nozzle and said second clamp arm extends between said engine flange and said projection on said engine to prevent said clamp arms from spreading apart upon movement of said locking spring to said locked position.

31. The apparatus of claim 30 in which said projection is an L-shaped member having a vertical leg and a horizontal leg, each of said clamp arms being formed with an end section which faces said vertical leg of said L-shaped member and extends below said horizontal leg thereof.

32. Apparatus for mounting an engine to the exhaust nozzle of a jet aircraft, comprising:

an engine flange having an inner surface and an outer surface;

an exhaust nozzle flange having an inner surface, an outer surface and a lip extending perpendicularly relative to at least a portion of said inner surface thereof, said inner surface of said exhaust nozzle flange abutting said inner surface of said engine flange so that said lip of said exhaust nozzle flange overlies said engine flange;

a clamp mounted to said lip of said exhaust nozzle flange, said clamp having a first clamp arm with an inner surface facing said outer surface of said engine flange and a second clamp arm with an inner surface facing said outer surface of said exhaust nozzle flange;

a locking spring positioned between said first clamp arm and said outer surface of said engine flange;

first wedge lock elements extending outwardly from said locking spring, and mating second wedge lock elements extending outwardly from one of said outer surface of said engine flange and said inner surface of said first clamp arm;

said locking spring being movable relative to said engine flange and said first clamp arm to a locked position in which said first wedge lock elements of said locking spring engage said mating second wedge lock elements to force said locking spring against said first clamp arm and said engine flange, said locking spring, engine flange and exhaust nozzle flange being tightly wedged between said first and second clamp arms of said clamp to connect the engine to the exhaust nozzle; and wherein said locking spring includes a stop which engages said clamp when said locking spring is in said locked position, said locking spring further engaging a fastening means, which fastens said exhaust nozzle flange and said engine flange, to retain said locking spring in said locked position relative to said engine flange.

33. A locking spring for connecting the first flange of a first element to the second flange of a second element, said first and second flanges each having an outer surface adapted to engage the first and second clamp arms, respectively, of a clamp, one of said first clamp arm of said clamp and said first flange of said first element being formed with spaced, second wedge lock elements, said locking spring comprising:

a strip having a planar inner surface and a planar outer surface, said strip being insertable between said first clamp arm of said clamp and said outer surface of said first flange;

first wedge lock elements extending outwardly from one of said planar inner surface and said planar outer surface of said strip, and third wedge lock elements extending outwardly from the other of said inner surface and said outer surface of said strip;

said strip being movable to a locked position between said first clamp arm and said first flange in which said first wedge lock elements on said strip engage said second wedge lock elements on one of said first clamp arm and said first flange and said third wedge lock elements on said strip engage the other of said first clamp arm and said first flange, said strip being tightly wedged between said first clamp arm and said first flange in said locked position for connecting said first and second elements together.

34. The locking spring of claim 33 in which said first wedge lock elements and said third wedge lock each comprise projections spaced along the length of said strip, each of said projections being formed with an outer, planar surface and opposed, angled ramp ends.

35. The locking spring of claim 33 in which, said first wedge lock elements formed on one of said inner and outer surfaces of said strip are staggered in between said third wedge lock elements formed on the other of said inner and outer surfaces of said strip.

36. A locking spring for connecting the first flange of a first element to the second flange of a second element, said first and second flanges each having an outer surface adapted to engage the first and second clamp arms, respectively, of a clamp, said first clamp arm of said clamp having an inner surface formed with spaced, second wedge lock elements, said locking spring comprising:
   a strip having a planar inner surface and a planar outer surface, said strip being insertable between said inner surface of said first clamp arm of said clamp and said outer surface of said first flange;
   first wedge lock elements extending outwardly from said planar outer surface of said strip, and third wedge lock elements extending outwardly from said planar inner surface of said strip;
   said strip being movable to a locked position between said first clamp arm and said first flange in which said first wedge lock elements on said strip engage said second wedge lock elements on said inner surface of said first clamp arm and said third wedge lock elements on said strip engage said outer surface of said first flange, said strip being tightly wedged between said first clamp arm and said first flange in said locked position for connecting said first and second elements together.

37. A locking spring for connecting the first flange of a first element to the second flange of a second element, said first and second flanges each having an outer surface adapted to engage the first and second clamp arms, respectively, of a clamp, said first clamp arm of said clamp having a substantially planar inner surface and said outer surface of said first flange of said first element being formed with spaced, second wedge lock elements, said locking spring comprising:
   a strip having an inner surface and an outer surface, said strip being insertable between said inner surface of said first clamp arm and said outer surface of said first flange;
   first wedge lock elements formed on said inner surface of said strip, and third wedge lock elements formed on said outer surface of said strip;
   said strip being movable to a locked position between said first clamp arm and said first flange in which said first wedge lock elements on said strip engage said second wedge lock elements on said outer surface of said first flange and said third wedge lock elements on said strip engage said planar inner surface of said first clamp arm, said strip being tightly wedged between said first clamp arm and said first flange with said strip in said locked position for connecting said first and second elements together.

38. A locking assembly for connecting the abutting first flange of a first element and second flange of a second element, comprising:
   a clamp having first and second clamp arms each having an inner surface, said first and second clamp arms being adapted to straddle said first flange of said first element and said second flange of said second element,
   a locking spring having a planar inner surface and a planar outer surface, said locking spring being adapted to be inserted between said inner surface of said first clamp arm and said first flange;
   first wedge lock elements extending outwardly from said planar outer surface of said locking spring, and mating second wedge lock elements extending outwardly from said planar inner surface of said first clamp arm;
   said locking spring being movable to a locked position between said first clamp arm and said first flange in which said first wedge lock elements on said locking spring engage said mating second wedge lock elements on said clamp arm to force said locking spring against said first clamp arm and said first flange, said locking spring and said first and second flanges being tightly wedged between said first and second clamp arms for connecting the first and second elements together.

39. A locking assembly for connecting the abutting first flange of a first element and second flange of a second element, each of said first and second flanges having an outer surface, said locking assembly comprising:
   a clamp having first and second clamp arms each having an inner surface, said first and second clamp arms being adapted to straddle said outer surface of said first flange of said first element and said outer surface of said second flange of said second element,
   a locking spring having an inner surface and an outer surface, said locking spring being adapted to be inserted between said inner surface of said first clamp arm and said outer surface of said first flange;
   first wedge lock elements formed on said inner surface of said locking spring, and mating second wedge lock elements formed on said outer surface of said first flange;
   said locking spring being movable to a locked position between said first clamp arm and said first flange in which said first wedge lock elements on said locking spring engage said mating second wedge lock elements on said first flange to force said locking spring against said first clamp arm and said first flange, said locking spring and said first and second flanges being tightly wedged between said first and second clamp arms for connecting the first and second elements together.

40. The method of mounting a first member to a second member, comprising:
   positioning a first flange formed on said first member into engagement with a second flange formed on said second member;
   positioning a locking spring formed with spaced first wedge lock elements extending outwardly therefrom upon a surface of said first flange having spaced second wedge lock elements extending outwardly therefrom so that said first wedge lock elements on said locking spring extend between adjacent second wedge lock elements on said first flange;

positioning a clamp having spaced clamp arms so that one of said clamp arms faces said second flange and the other of said clamp arms faces said locking spring positioned on said first flange;

moving said locking spring relative to first flange so that said first wedge lock elements on said locking spring engage said second wedge lock elements on said first flange, said locking spring being forced against said other of said clamp arms to wedge said locking spring and said first and second flanges between said clamp arms of said clamp.

41. The method of claim 40 in which said step of moving said locking spring relative to said first flange comprises moving third wedge lock elements formed on a side of said locking spring opposite and spaced between said first wedge lock elements into engagement with said other of said clamp arms of said clamp.

42. The method of mounting the annular flange of an engine to the annular flange of an exhaust nozzle in an aircraft, comprising:

providing a lip on said exhaust nozzle flange extending perpendicularly thereto and along approximately a 180° length on the upper half of said exhaust nozzle flange, the lower half of said exhaust nozzle flange being formed with spaced bores;

providing spaced wedge lock elements on an outer surface of said engine flange which extends outwardly therefrom along approximately a 180° arc length on the upper half of said engine flange, the lower half of said engine flange being formed with spaced bores;

positioning a pair of locking springs each extending along a 90° arc length and having spaced wedge lock elements extending outwardly therefrom onto said outer surface of said engine flange so that said wedge lock elements on said locking springs extend between adjacent wedge lock elements on said outer surface of said engine flange;

positioning said engine flange into abutment with said exhaust nozzle flange so that said lip on said exhaust nozzle flange overlies said upper half of said engine flange, and said bores in the lower half of said engine flange align with said bores in the lower half of said exhaust nozzle flange;

positioning a clamp having spaced clamp arms so that one of said clamp arms faces the outer surface of said exhaust nozzle flange and the other of said clamp arms substantially faces said locking springs carried on said engine flange, said locking springs each having a portion extending circumferentially outward beyond said clamp;

connecting bolts between said aligning bores of said lower half of said engine flange and said exhaust nozzle flange;

striking said outwardly extending portion of each of said locking springs to slide said locking springs relative to said engine flange so that said wedge lock elements on said locking springs engage said wedge lock elements on said engine flange, said locking springs being wedged between said engine flange and said other of said clamp arms to securely clamp said locking springs, engine flange and exhaust nozzle flange between said clamp arms of said clamp.

43. Apparatus for connecting a first annular element to a second annular element, comprising:

a first annular flange formed on said first annular element, said first annular flange having an inner surface and an outer surface;

a second annular flange formed on said second annular element, said second annular flange having an inner surface and an outer surface, said inner surface of said second annular flange abutting said inner surface of said first annular flange;

an annular clamp having first and second annular clamp arms which straddle said outer surface of a first annular flange and said outer surface of said second annular flange;

a locking spring having a planar surface positioned between said first annular clamp arm and said outer surface of said first annular flange;

first wedge lock annular elements extending outwardly from a surface of said locking spring planar surface, and mating second wedge lock annular elements extending outwardly from one of said first annular clamp arm and said outer surface of said first annular flange;

said locking spring being movable to a locked position between said first annular clamp arm and said first annular flange in which said first wedge lock annular elements engage said mating second wedge lock annular elements to force said locking spring against said first annular clamp arm and said outer surface of said first annular flange, said locking spring and said first and second annular flanges being tightly wedged between said first and second annular clamp arms for connecting the first and second annular elements together.

44. Apparatus for connecting a first annular element to a second annular element, comprising:

a first annular flange formed on said first annular element, said first annular flange having an inner surface and an outer surface;

a second annular flange formed on said second annular element, said second annular flange having an inner surface and an outer surface, said inner surface of said second annular flange abutting said inner surface of said first annular flange;

an annular clamp having first and second annular clamp arms which straddle said outer surface of a first annular flange and said outer surface of said second annular flange;

a locking spring positioned between said first annular clamp arm and said outer surface of said first annular flange;

first wedge lock annular elements extending outwardly from said locking spring, and mating second wedge lock annular elements extending outwardly from one of said first annular clamp arm and said outer surface of said first annular flange;

said locking spring being movable to a locked position between said first annular clamp arm and said first annular flange in which said first wedge lock annular elements engage said mating second wedge lock annular elements to force said locking spring against said first annular clamp arm and said outer surface of said first annular flange, said locking spring and said first and second annular flanges being tightly wedged between said first and second annular clamp arms for connecting the first and second annular elements together; and wherein said locking spring is formed with an inner surface and an outer surface, said first wedge lock elements being formed on said inner surface thereof which faces said outer surface of said first annular flange, and said mating second wedge lock elements being formed on said facing outer surface of said first annular flange.

45. The apparatus of claim 44 in which said outer surface of said locking spring faces said first annular clamp arm and is formed with third wedge lock elements which contact said first annular clamp arm upon movement of said locking spring to said locked position.

46. The apparatus of claim 43 in which said first and second annular clamp arms each have an inner surface facing one of said first and second annular flanges, said locking spring being formed with an inner surface and an outer surface, said first wedge lock elements being formed on said outer surface of said locking spring which faces said inner surface of said first annular clamp arm, said mating second wedge lock elements being formed on said facing inner surface of said first annular clamp arm.

47. The apparatus of claim 46 in which said inner surface of said locking spring faces said outer surface of said first annular flange and is formed with third wedge lock elements which contact said first annular flange upon movement of said locking spring to said locking position.

48. The apparatus of claim 43 in which said second annular flange is formed with a lip, said lip overlying at least a portion of said first annular flange.

49. The apparatus of claim 43 in which said annular clamp is a C-shaped member formed with a band connecting said first and second annular clamp arms.

50. Apparatus for connecting a first annular element to a second annular element, comprising:
   a first annular flange formed on said first annular element, said first annular flange having an inner surface and an outer surface;
   a second annular flange formed on said second annular element, said second annular flange having an inner surface and an outer surface, said inner surface of said second annular flange abutting said inner surface of said first annular flange;
   an annular clamp having first and second annular clamp arms which straddle said outer surface of a first annular flange and said outer surface of said second annular flange;
   a locking spring positioned between said first annular clamp arm and said outer surface of said first annular flange;
   first wedge lock annular elements extending outwardly from said locking spring, and mating second wedge lock annular elements extending outwardly from one of said first annular clamp arm and said outer surface of said first annular flange;
   said locking spring being movable to a locked position between said first annular clamp arm and said first annular flange in which said first wedge lock annular elements engage said mating second wedge lock annular elements to force said locking spring against said first annular clamp arm and said outer surface of said first annular flange, said locking spring and said first and second annular flanges being tightly wedged between said first and second annular clamp arms for connecting the first and second annular elements together; wherein said annular clamp is a C-shaped member formed with a band connecting said first and second annular clamp arms; and in which each of said first and second annular elements is formed with a stop, each of said annular clamp arms of said annular clamp being formed to engage said stop in one of said first and second annular elements to prevent said annular clamp arms from spreading apart relative to one another upon movement of said locking annular element to said locked position.

51. The apparatus of claim 50 in which said stop is a projection connected to each of said first and second annular elements, each of said projections having a planar surface engageable with one of said first and second annular clamp arms.

52. The apparatus of claim 50 in which said stop is an L-shaped projection having a vertical leg connected to a horizontal leg, said annular clamp being positioned relative to said L-shaped projections so that each of said annular clamp arms face said vertical leg, and said horizontal leg overlies at least a portion of each said annular clamp arms.

53. Apparatus for connecting a first annular element to a second annular element, comprising:
   a first annular flange formed on said first annular element, said first annular flange having an inner surface and an outer surface;
   a second annular flange formed on said second annular element, said second annular flange having an inner surface and an outer surface, said inner surface of said second annular flange abutting said inner surface of said first annular flange;
   an annular clamp having first and second annular clamp arms which straddle said outer surface of a first annular flange and said outer surface of said second annular flange;
   a locking spring positioned between said first annular clamp arm and said outer surface of said first annular flange;
   first wedge lock annular elements extending outwardly from said locking spring, and mating second wedge lock annular elements extending outwardly from one of said first annular clamp arm and said outer surface of said first annular flange;
   said locking spring being movable to a locked position between said first annular clamp arm and said first annular flange in which said first wedge lock annular elements engage said mating second wedge lock annular elements to force said locking spring against said first annular clamp arm and said outer surface of said first annular flange, said locking spring and said first and second annular flanges being tightly wedged between said first and second annular clamp arms for connecting the first and second annular elements together; and
   wherein said locking spring is provided with a stop engageable with said annular clamp with said locking spring in said locked position to ensure said wedge lock elements of said locking spring are positioned to mate with said wedge lock elements formed on one of said annular clamp and said first annular flange.

54. The apparatus of claim 43 in which said annular clamp is formed with an extension adapted to engage a stop formed on one of said first and second members, said extension of said annular clamp engageable with said stop for preventing movement of said annular clamp relative to said first and second annular flanges.

55. Apparatus for connecting a first annular element to a second annular element, comprising:

a first annular flange formed on said first annular element, said first annular flange having an inner surface and an outer surface;

a second annular flange formed on said second annular element, said second annular flange having an inner surface and an outer surface, said inner surface of said second annular flange abutting said inner surface of said first annular flange;

an annular clamp having first and second annular clamp arms which straddle said outer surface of a first annular flange and said outer surface of said second annular flange;

a locking spring positioned between said first annular clamp arm and said outer surface of said first annular flange;

first wedge lock annular elements extending outwardly from said locking spring, and mating second wedge lock annular elements extending outwardly from one of said first annular clamp arm and said outer surface of said first annular flange;

said first wedge lock elements comprise a generally rectangular shaped section having a planar outer surface and opposed, angled ramp ends;

said locking spring being movable to a locked position between said first annular clamp arm and said first annular flange in which said first wedge lock annular elements engage said mating second wedge lock annular elements to force said locking spring against said first annular clamp arm and said outer surface of said first annular flange, said locking spring and said first and second annular flanges being tightly wedged between said first and second annular clamp arms for connecting the first and second annular elements together.

56. Apparatus for connecting a first annular element to a second annular element, comprising:

a first annular flange formed on said first annular element, said first annular flange having an inner surface and an outer surface;

a second annular flange formed on said second annular element, said second annular flange having an inner surface and an outer surface, said inner surface of said second annular flange abutting said inner surface of said first annular flange;

said second wedge lock elements comprise a generally rectangular shaped section having a planar outer surface and opposed, angled ramp ends;

an annular clamp having first and second annular clamp arms which straddle said outer surface of a first annular flange and said outer surface of said second annular flange;

a locking spring positioned between said first annular clamp arm and said outer surface of said first annular flange;

first wedge lock annular elements extending outwardly from said locking spring, and mating second wedge lock annular elements extending outwardly from one of said first annular clamp arm and said outer surface of said first annular flange;

said locking spring being movable to a locked position between said first annular clamp arm and said first annular flange in which said first wedge lock annular elements engage said mating second wedge lock annular elements to force said locking spring against said first annular clamp arm and said outer surface of said first annular flange, said locking spring and said first and second annular flanges being tightly wedged between said first and second annular clamp arms for connecting the first and second annular elements together.

* * * * *